United States Patent
Honer et al.

(10) Patent No.: US 7,712,640 B2
(45) Date of Patent: May 11, 2010

(54) MANNEQUIN SYSTEM

(75) Inventors: Peter D. Honer, Neenah, WI (US); Robert C. Pilecky, Oshkosh, WI (US); Frank F. Kromenaker, Hortonville, WI (US); Shawn J. Sullivan, Neenah, WI (US); Simon K. Poruthoor, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 748 days.

(21) Appl. No.: 11/131,557

(22) Filed: May 17, 2005

(65) Prior Publication Data
US 2005/0258199 A1 Nov. 24, 2005

Related U.S. Application Data

(60) Provisional application No. 60/572,372, filed on May 18, 2004.

(51) Int. Cl.
*D06C 15/00* (2006.01)
(52) U.S. Cl. .......................................... 223/66; 223/52
(58) Field of Classification Search .................. 223/1, 223/52, 66, 71, 84, 68; 40/415, 414, 420, 40/472; 446/358, 359, 365
See application file for complete search history.

(56) References Cited

U.S. PATENT DOCUMENTS

| | | | |
|---|---|---|---|
| 3,949,521 A | 4/1976 | Heerlein | |
| 3,973,840 A * | 8/1976 | Jacobs et al. | ......... 352/86 |
| 4,067,138 A | 1/1978 | Cederholm et al. | |
| 4,266,367 A | 5/1981 | Kuna et al. | |
| 5,094,644 A * | 3/1992 | Kelley | ......... 446/305 |
| 5,142,803 A | 9/1992 | Lang | |
| 5,343,397 A | 8/1994 | Yoshino et al. | |
| 5,443,188 A | 8/1995 | Kotlarsky et al. | |
| 5,623,944 A | 4/1997 | Nashner | |
| 5,753,834 A * | 5/1998 | Stewart | ......... 73/865.3 |
| 5,924,694 A * | 7/1999 | Kent | ......... 273/408 |
| 6,085,914 A | 7/2000 | Tobaccowala et al. | |
| 6,695,770 B1 * | 2/2004 | Choy et al. | ......... 600/38 |
| 2004/0118225 A1 * | 6/2004 | Wright et al. | ......... 73/866 |

FOREIGN PATENT DOCUMENTS

JP 02-086429 A 3/1990

(Continued)

OTHER PUBLICATIONS

Hayes, W.C. et al., "A Mathematical Analysis for Indentation Tests of Articular Cartilage," *Journal of Biomechanics*, vol. 5, 1972, pp. 541-551.

(Continued)

*Primary Examiner*—Shaun R Hurley
*Assistant Examiner*—Andrew W Sutton
(74) *Attorney, Agent, or Firm*—Alyssa A. Dudkowski

(57) ABSTRACT

The present invention relates to mannequin systems that can be used for simulating motion for the performance testing of garments, including absorbent articles. The systems may include an assembled framework and a mannequin secured within the assembled framework. Motion of the mannequin is generated by an integrated system of pneumatic cylinders and a motor drive assembly. The mannequin may be made of a reinforced elastomeric composite material.

6 Claims, 13 Drawing Sheets

FOREIGN PATENT DOCUMENTS

| JP | 02-164522 A |   | 6/1990 |
| --- | --- | --- | --- |
| JP | 03-071828 A |   | 3/1991 |
| JP | 11-179063 A | * | 7/1999 |
| JP | 2001-214025 A |   | 8/2001 |

OTHER PUBLICATIONS

Pathak, Arvind P. et al. "A Rate-Controlled Indentor for In Vivo Analysis," *IEEE Transactions on Rehabilitation Engineering,* vol. 6, No. 1, Mar. 1998 pp. 12-20.

Zhang, Ming et al., "Estimating the Effective Young's Modulus of Soft Tissues From Indentation Tests—Nonlinear Finite Element Analysis of Effects of Friction and Large Deformation," *Medical Engineering & Physics,* vol. 19, No. 6, 1997, pp. 512-517.

Zheng, Yongping et al., "Objective Assessment of Limb Tissue Elasticity:Development of a Manual Indentation Procedure," *Journal of Rehabilitation Research & Development,* vol. 36, No. 2, Apr. 1999, pp. 1-25.

* cited by examiner

MANNEQUIN SYSTEM

RELATED PATENT APPLICATIONS

This patent application claims priority to the filing date of U.S. Provisional Patent Application Ser. No. 60/572,372 entitled "Improved Mannequin for Evaluating Articles" filed on May 18, 2004.

BACKGROUND OF THE INVENTION

Absorbent articles, particularly disposable absorbent articles, have undergone an evolution since they first became commercially available. Materials and features made available by new technologies have improved the function and fit of absorbent articles. Before new designs and features become available on commercial products, substantial research and development efforts are necessary to ensure that the products will perform as expected. Development efforts typically include "bench top" laboratory tests to measure features and performance such as strength, flexibility or breathability. While reliable and useful, the bench top tests are not capable of accounting for the conditions experienced during normal use of absorbent articles. Desirably, absorbent articles are tested through use by consumers who later provide feedback.

While the results are extremely useful, consumer use testing has its disadvantages. For example, consumer use testing is costly and time consuming. Additionally, consumer feedback is subjective and sometimes has a high degree of variability. In order to bridge the gap between bench top test methods and consumer use tests, product testing with life-like models may be used to test the design and performance of absorbent articles. Life-like models such as mannequins or robots may be used to test absorbent articles under more realistic conditions without the time necessary and the cost incurred for consumer testing.

During the last decade there has been a surge in the technology of robotics. Most robots are designed to repeat a mechanical function many times for use in an assembly process. The technology developments have been due, in part, to advances in computer controls and superior materials. Androids are a specialized segment of robotics. An android is an anthropomorphic robot, that is, a robot that looks like or moves like a human. The following are examples of significant and well-known efforts in the area of anthropomorphic robots: (1) ASIMO (Advanced Step in Innovative Mobility) is a walking android developed by Honda Motor Co. of Tokyo, Japan. Honda has reported that over $100 MM has been spent on the development of ASIMO. Honda is developing ASIMO to act as a helper to people in need; (2) "Crash Test Dummies" have been under development for over fifty years for use by the automobile industry to measure car safety in crashes. The "Hybrid III" developed by General Motors Co. represents an industry standard for crash testing; and (3) ADAM (Advanced Automotive Manikin) will be the world's most advanced thermal comfort mannequin. ADAM is being developed by the U.S. Department of Energy's National Renewable Energy Laboratory (NREL) to mimic human responses such as sweating and breathing. ADAM will measure, predict and validate human physiological and psychological responses to the transient, non-uniform thermal environment found in motor vehicles. While more and more industrial applications for mannequin testing are identified, there is still cost associated with developing and conducting mannequin-based test methods. There remains a need for more life-like mannequin systems, particularly mannequin systems for evaluating the design and performance of absorbent articles.

Mannequin systems have been especially developed for testing of absorbent articles. Absorbent articles may include disposable absorbent articles such as infant diapers, diaper pants, toddler training pants, feminine care articles and adult incontinence pads and briefs. For example, Courtray Consulting in Douai, France sells a system of static baby mannequins for measuring urine leakage of infant diapers. While such systems are useful for conducting performance testing, they have some limitations. For example, existing mannequin systems do not necessarily match the skin and tissue conformance of humans, the systems are not very durable, the systems do not provide life-like movement and the systems are very costly.

SUMMARY OF THE INVENTION

The present invention is directed to a mannequin system that can be used simulate human motion. The mannequin system may be used to test the wear traits and performance of garments. The mannequin system includes an assembled framework. In order to reduce the weight of the assembled framework, the assembled framework may be constructed of aluminum and anodized. The mannequin system also includes a mannequin secured within the assembled framework. The mannequin may be shaped to represent all or a portion of a human body. If the mannequin system is used to test the wear and performance of absorbent articles (e.g. disposable diapers), the mannequin may be shaped to represent the lower torso and legs of a small child. The mannequin may be formed of a reinforced elastomeric composite material. The reinforced elastomeric composite material may include a silicone material reinforced with a knitted nylon. The reinforced elastomeric composite material increases the durability of the mannequin, particularly the tear resistance at the "joints" of the mannequin that are subjected to repetitive motion. The mannequin system also includes a programmable logic controller that coordinates and controls the motion of the mannequin. The motion of the mannequin is provided by integrated action of a set of pneumatic cylinders and a motor drive assembly.

In another aspect, the present invention is directed to an evaluation system for evaluating the wear and performance of garments. The evaluation system includes a personal computer and a computer interface board that control at least two mannequin systems. Each mannequin system includes an assembled framework and a mannequin secured within the assembled framework. The shape of the mannequin may be selected based on the type of garments to be evaluated. The mannequin may be formed of a reinforced elastomeric composite material. Each mannequin system also includes a programmable logic controller. The programmable logic controller coordinates and controls the motion of the mannequin. The motion of the mannequin is provided by a combination of a set of pneumatic cylinders and a motor drive assembly that are also part of the mannequin system.

These aspects and additional aspects of the invention will be described in greater detail herein. Further, it is to be understood that both the foregoing general description and the following detailed description are exemplary and are intended to provide further explanation of the invention claimed. The accompanying drawings, that are incorporated in and constitute part of this specification, are included to illustrate and provide a further understanding of the mannequin systems and evaluation systems of the invention.

Together with the description, the drawings serve to explain various aspects of the invention.

BRIEF DESCRIPTION OF THE DRAWINGS

The present invention will be more fully understood and further advantages will become apparent when reference is made to the following detailed description of the invention and the accompanying drawings wherein like numerals represent like elements. The drawings are merely representative and are not intended to limit the scope of the appended claims.

DETAILED DESCRIPTION OF THE INVENTION

The present disclosure of the invention will be expressed in terms of its various components, elements, constructions, configurations, arrangements and other features that may also be individually or collectively be referenced by the term, "aspect(s)" of the invention, or other similar terms. It is contemplated that the various forms of the disclosed invention may incorporate one or more of its various features and aspects, and that such features and aspects may be employed in any desired, operative combination thereof.

It should also be noted that, when employed in the present disclosure, the terms "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

The present invention is directed to solving problems related to providing mannequin systems for the testing of garments that are able to better simulate the soft tissue properties of human subjects, particularly the soft tissue properties of infants and toddlers. Further the mannequin systems of the present invention are less costly, more durable and better mimic life-like movement than currently available mannequins.

Description of Mannequin System of the Invention

Figure 1:
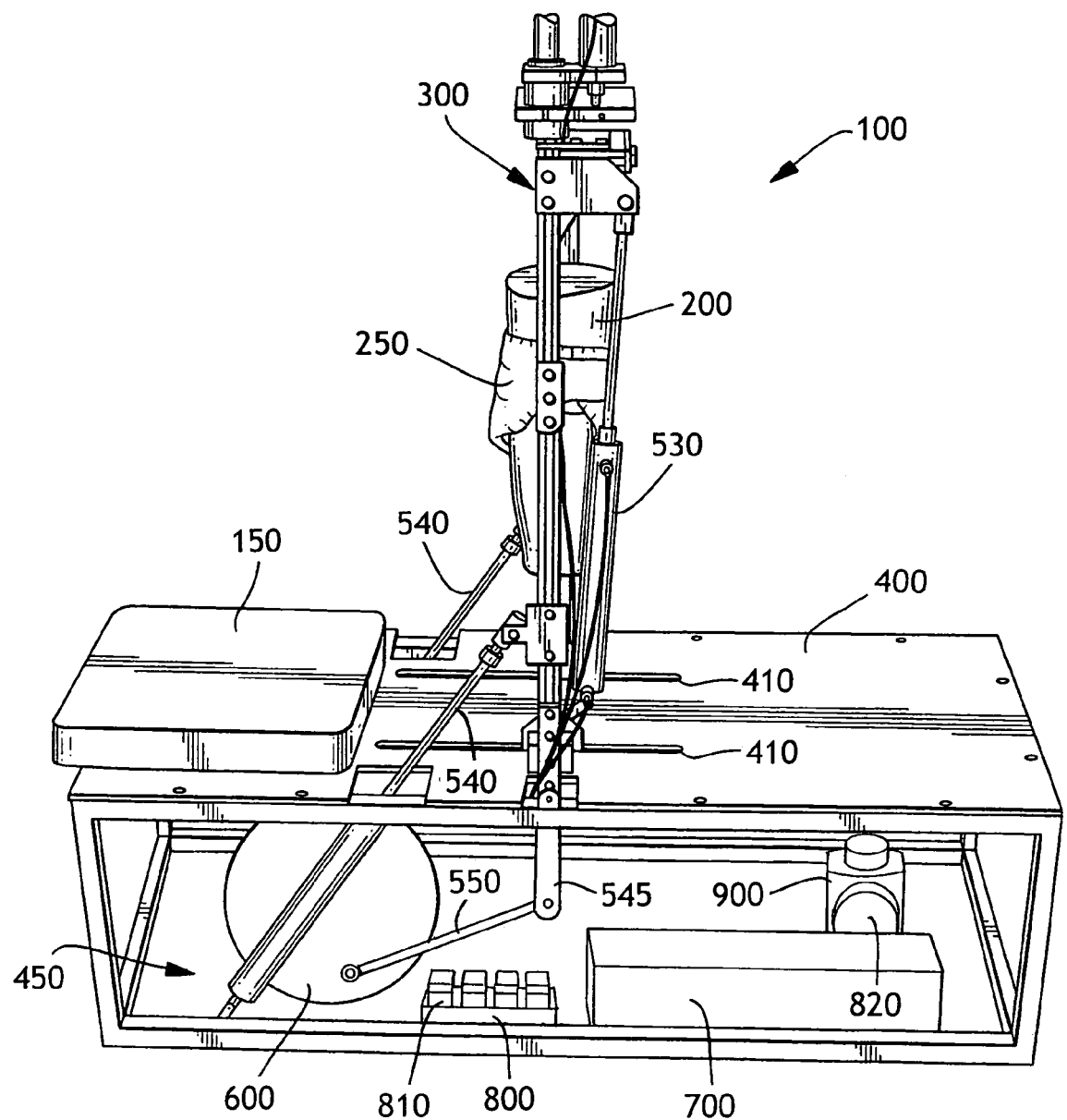
FIG. 1 representatively shows a perspective view of an exemplary mannequin system of the invention; the mannequin system includes a mannequin which is shaped to represent the lower torso of a human infant or toddler; the mannequin is shown donning a representative garment to be tested (e.g. a disposable diaper)

An example of the improved mannequin system 100 of the invention is representatively shown in FIG. 1. The mannequin system 100 of FIG. 1 is a low cost mechanical design with computer control to better simulate human body motions and functions. The mannequin system includes a mannequin 200 representing the lower torso of a human body that is installed and supported in an assembled framework 300. The mannequin 200 is shown wearing a representative absorbent article 250. The assembled framework 300 includes pneumatic and electrical components to provide human-like movement to the mannequin 200. Through the use of pneumatic cylinders and electronic motors, the assembled framework 300 provides for the mannequin 200 to experience walking and crawling motions at adjustable speeds as well as providing for the mannequin 200 to complete the motions of lying down and sitting up. The assembled framework 300 is attached to a working surface or base 400 that is on top of a component area 450. The working surface 400 includes two slots 410, one for each leg of the mannequin 200. The working surface 400 also includes a soft pad 150 on one end; the soft pad 150 represents/simulates a mattress such as one that an infant/toddler would lie on while in the prone (lying down) position.

Figure 2:
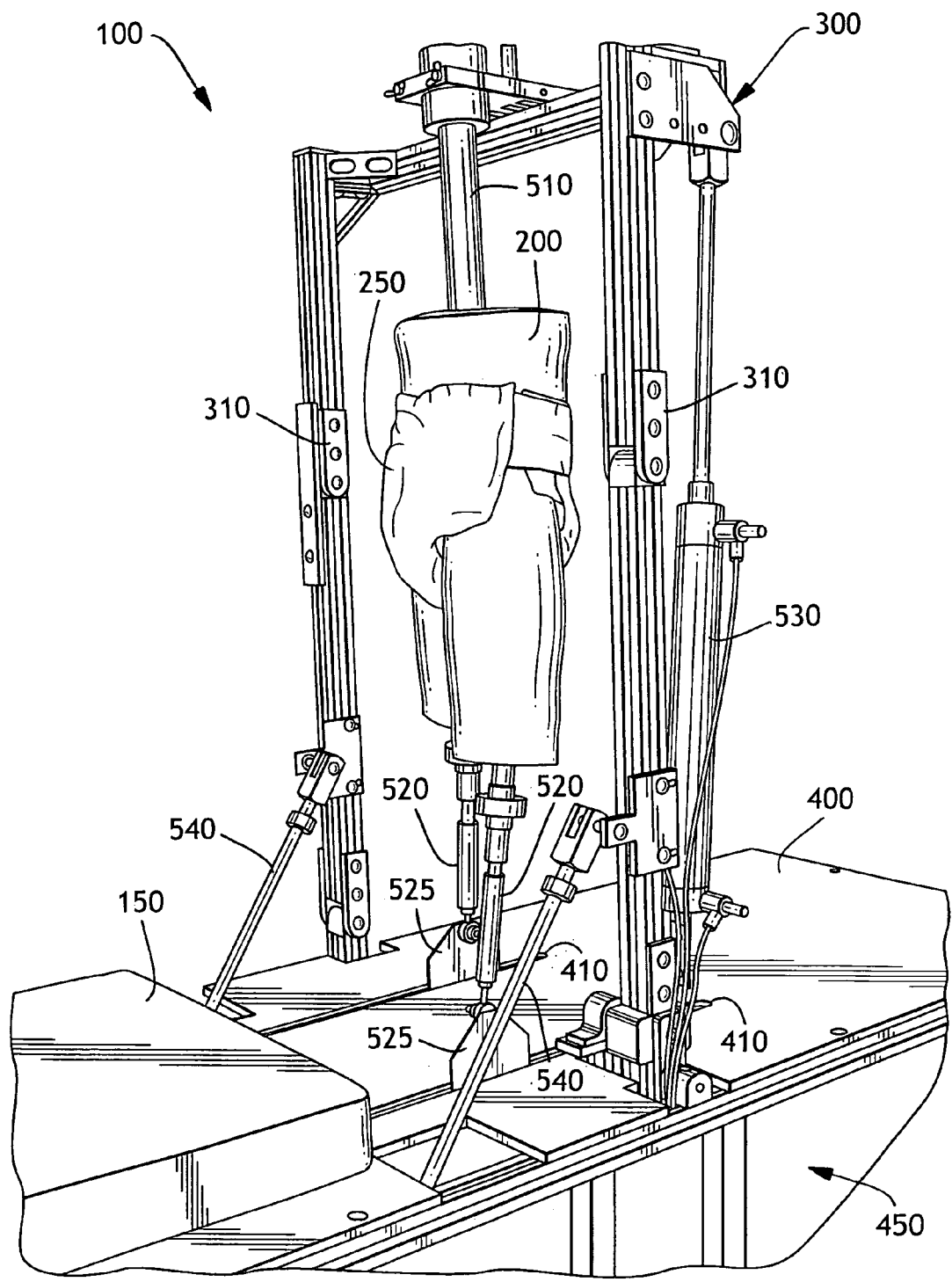
FIG. 2 representatively shows another perspective view of the mannequin system of FIG. 1; in this view, the back of the mannequin and the garment are visible and the legs of the mannequin are in the walking position.

The assembled framework 300 holds the mannequin 200 in place when the mannequin 200 is both stationary and in motion and it facilitates the human-like motion of the mannequin 200. The assembled framework 300 may be constructed of aluminum so that it is not heavy and it may be anodized. Suitable components for the assembled framework 300 may be purchased from 80/20, Inc. located in Columbia City, Ind. The assembled framework 300 is secured to the working surface 400 and the component area 450 for stability. The assembled framework 300 includes two hinge pins 310 that permit the upper portion of the assembled framework 300 to pivot relative to the lower portion of the assembled framework 300. The mannequin is secured to the assembled framework by an upward shaft 510 and by two, leg sockets 520 as shown in FIG. 2. Each leg socket 520 is pivotally attached to a mannequin leg interface 525. Each mannequin leg interface 525 is attached to a linear slide that moves along a rail positioned below the slot 410 of the working surface 400 (the linear slides and rails are not visible in the figures). The rails located below the slots 410 function as tracks for the motion of the legs of the mannequin 200. The linear slides are set opposite each other so that one linear slide is moving forward as the other linear slide is moving backward.

The mannequin 200 moves by the coordinated action of several pneumatic cylinders. The mannequin system 100 depicted in the figures includes four (4) pneumatic cylinders, of which three are visible. In order to provide "lift" to the mannequin 200 when it is performing the walking motion, there is a pneumatic cylinder that moves the upward shaft 510 up and down. This pneumatic cylinder is located above the portion of the upward shaft 510 visible in FIGS. 1 and 2. Additionally, the upward shaft 510 is secured in a collar by locating pins; the collar and locating pins prevent the mannequin 200 from twisting from side to side. The collar and locating pins are not visible in FIGS. 1 and 2. The mannequin system 100 depicted in FIGS. 1 and 2 also includes a side pneumatic cylinder 530 and two (2) side-supporting pneumatic cylinders 540. The side pneumatic cylinder 530 takes the mannequin 200 from a sitting position to a lying down (or prone) position and from a lying down position to a sitting position. The side pneumatic cylinder 530 also takes the mannequin 200 from a standing position to a crawling position and from a crawling position to a standing position. The side-supporting pneumatic cylinders 540 take the mannequin 200 from a lying down position to a standing position and from a standing position to a lying down position. Having two side-supporting pneumatic cylinders 540 helps support the weight of the assembled framework 300 and the mannequin 200. Suitable pneumatic cylinders include double-acting pneumatic cylinders available from Bimba Manufacturing Co. located in Monee, Ill.

The component area 450 may include various elements that power and control the movements of the mannequin 200. FIG. 1 representatively shows the location of a motor drive assembly 600, a programmable logic controller 700, a manifold 800 including four air solenoid valves 810, an air pressure regulator 820 and a computer interface board 900 within the component area 450. The linear slides seated on the rails below the slots 410 are connected to interface pieces 545; an exemplary interface piece 545 is shown in FIG. 1. The interface piece 545 is attached by a bearing to a linear crank arm 550 that is driven by the motor drive assembly 600. The motor drive assembly 600 is used to make the mannequin 200 walk and crawl. The motor drive assembly 600 may include a 0-90 VDC right angle gear motor and associated motor driver that controls the speed and direction of the motor. An example of a suitable motor is a −90 VDC right angle gear drive, ⅛ HP, 22.5.1 gear ratio, 78 RPM @ 60 lbs./in. having catalog number # SP7401 available from Baldor Electric Co. located in Fort Smith, Ark. An example of a suitable motor drive controller is a Minarik Corporation model # XPO2-115AC-Q available from the Minarik Corporation located in Glendale, Calif.

The pneumatic cylinders 530 and 540 are activated by air solenoid valves 810. Suitable air solenoid valves 810 are available from the Humphrey Products Company located in Kalamazoo, Mich. and have model # M41 E1 and have a 24 VDC activation coil. The air solenoid valves 810 may be seated in a manifold 800 that eliminates the need to have fittings for individual air solenoid valves 810. Fittings for each of the air solenoid valves 810 come out of the manifold 800 and are connected to four respective air cylinders. The air solenoid valves 810 are configured to receive a fixed voltage of 24 VDC from the programmable logic controller 700 to create a mechanical result. The air solenoid valves are associated with an air pressure regulator 820.

The mannequin system 100 also includes an electronic programmable logic controller ("PLC") 700 that controls the logic and interlocking phases that allow the mannequin 200 to function as intended. The PLC 700 coordinates and controls the action of the pneumatic cylinders 530 and 540 by sending fixed 24 VDC voltage signals to the air solenoid valves 810. The mannequin 200 is able to perform logic functions such as walking, crawling, sitting up, sitting down and lying down. The logic functions are binary-like functions of a state of "on" or a state of "off". An example of a suitable PLC 700 is an Allan Bradley (owned by Rockwell Automation) Micrologix 1000 series programmable logic controller having model # 1761-L32BWA available from Rockwell Automation of Milwaukee, Wis. The PLC 700 includes its own "ladder-logic" software that allows the PLC 700 to be used as a tool to ensure that "commands" are aligned before a motion can or will be carried out by the mannequin system 100 (e.g. a dynamic function will not be activated when the mannequin 200 is in the prone position). Additionally, the mannequin system 100 may include a low voltage power supply. The mannequin system 100 generally operates from a common 120 VAC and 24 VDC. The low voltage power supply converts 120 VAC to 24 VDC to operate logic items such as the air solenoid valves 810. An example of a suitable low voltage power supply is the model # SLS-24-120T having 24 VDC @ 12.0 amps available from Sola/Hevi-Duty of the EGS Electrical Group of Rosemont, Ill.

While the PLC 700 may be used to operate the mannequin system 100 by itself, the desired commands for the mannequin system 100 may be input to the PLC 700 through a computer to allow for programming of an infinite variety of motion routines. A personal computer enables the mannequin system 100 to run sequential functions such as walking for 5 minutes followed by crawling for 5 minutes, etc. In order to provide ease of mannequin control, signals need to be converted from an analog format to a digital computer format. A computer interface board 920 may be included in order to convert the signals. An example of a suitable computer interface board 920 is a model # PCI-6036E available from the National Instruments Corporation of Austin, Tex. Such a computer interface board 920 may be installed in the expansion slots of a desktop personal computer. One personal computer may be used to run up to four mannequin systems 100 at one time. The mannequin system 100 includes software that can be used to establish the desired motion routines and that communicates the desired series of motions to the PLC 700. Exemplary software for operating the mannequin system 100 may be developed in the MICROSOFT VISUAL BASIC 6 software development environment (available from the Microsoft Corporation in Redmond, Wash.). There may also be supporting software, such as the supporting software available from National Instruments Corporation (Austin, Tex.) known as MEASUREMENT STUDIO development software. In one aspect of the invention, a mannequin interface card may be used to convert higher voltage signals from the PLC 700 to a common 5 Volt signal used by the computer interface. The software may be configured to send signals to and receive signals from the mannequin system 100 so that the movements of the mannequin 200 may be monitored and controlled. Therefore, the software enables a display for an operator to know the current status of the mannequin 200 (e.g. lying, standing, sitting, crawling and walking). The software may also provide for a display of the desired and actual speed at which the limbs of the mannequin 200 will move (e.g. steps per minute). The MEASUREMENT STUDIO development software may be used to generate knobs, slide controls and indicator lights for the user-interface of the software system. This supporting software also provides a high level interface with a data acquisition card, for example a data acquisition card model # PCI-6036E also available from National Instruments Corporation.

Figure 3:
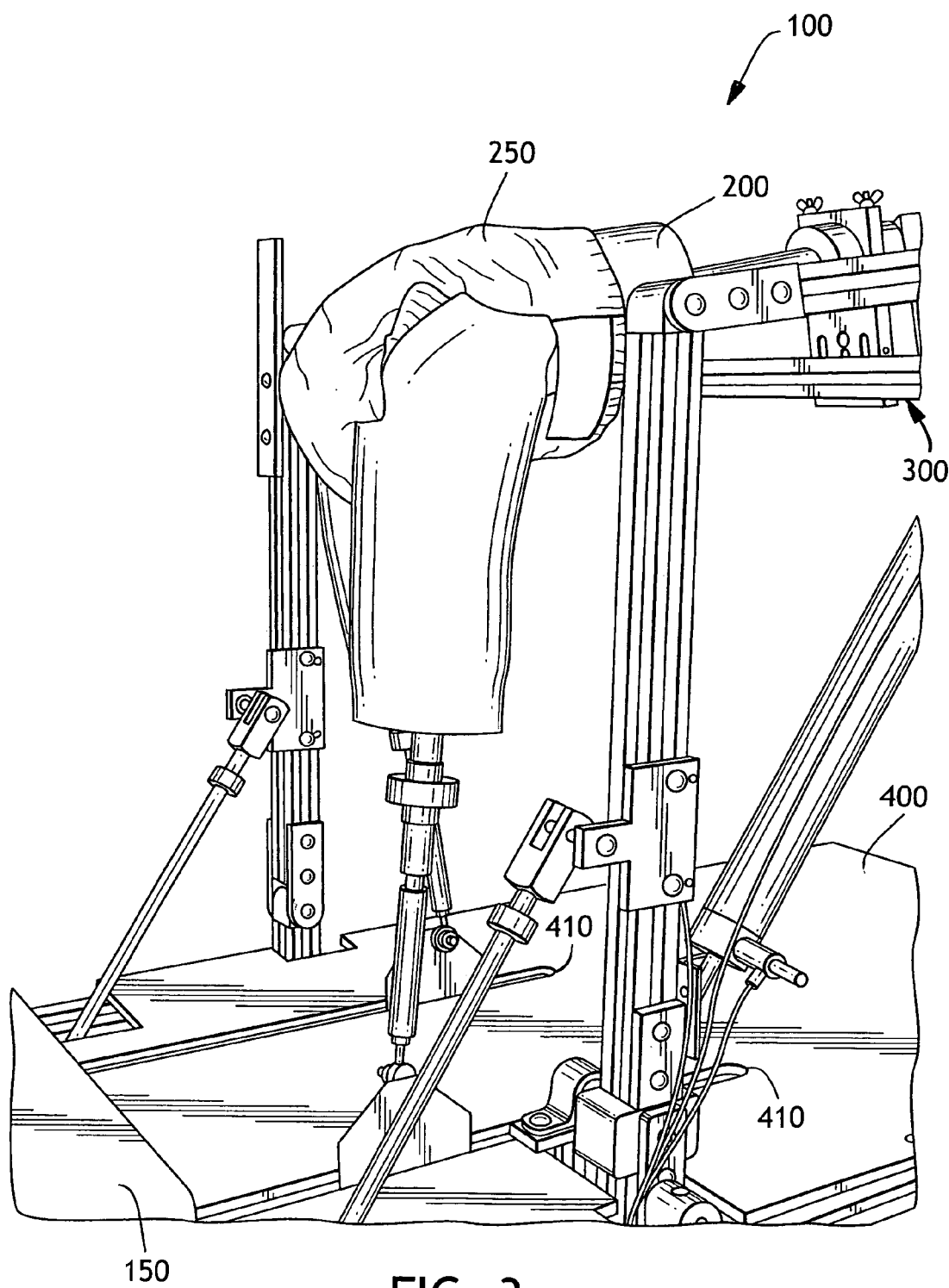
FIG. 3 representatively shows a perspective view of the mannequin system of FIG. 1 where the mannequin is in a crawling position.
Figure 4:
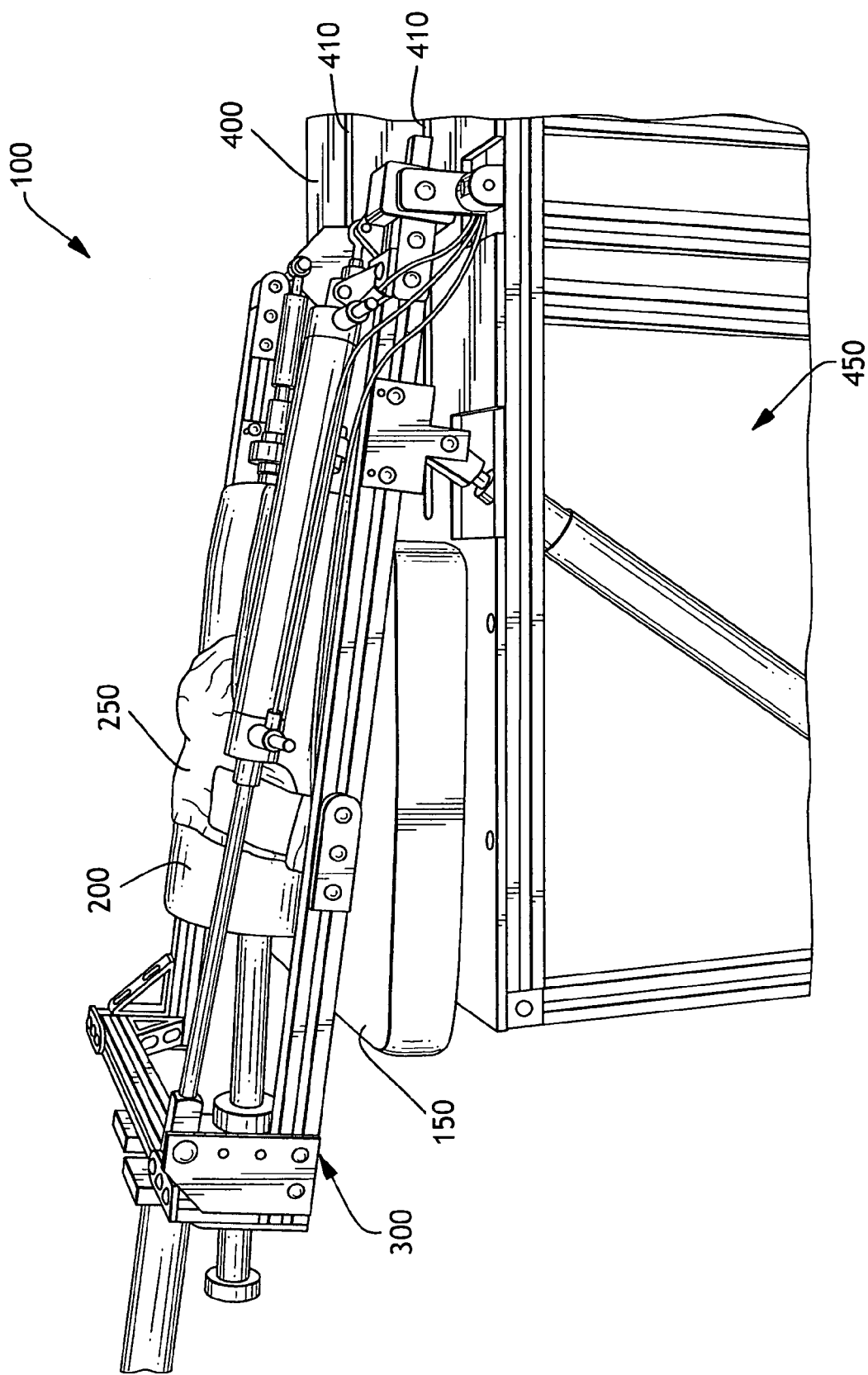
FIG. 4 representatively shows a perspective view of the mannequin system of FIG. 1 where the mannequin is in a prone, lying down position.
Figure 5:
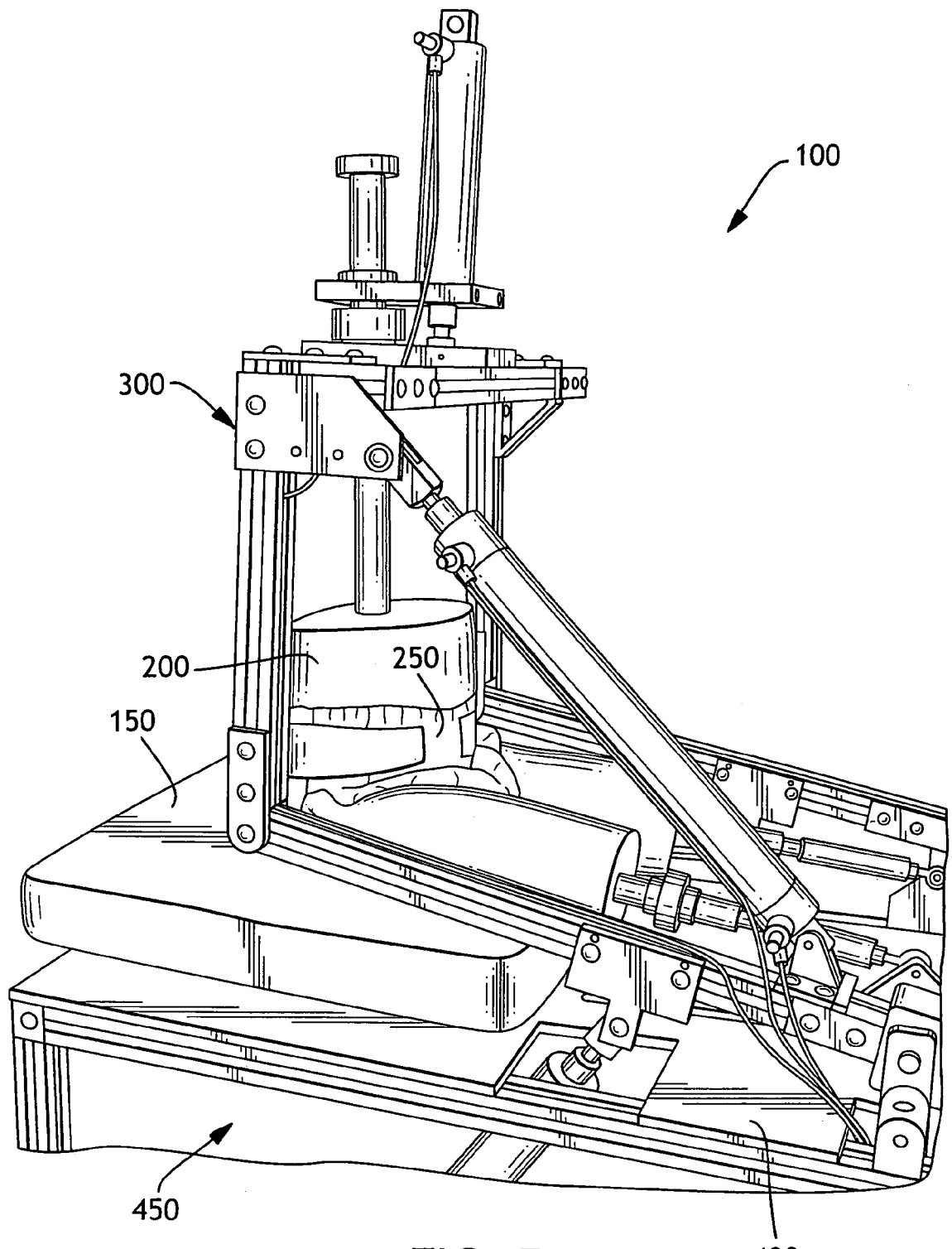
FIG. 5 representatively shows a perspective view of the mannequin system of FIG. 1 where the mannequin is in a sitting position.
Figure 6:
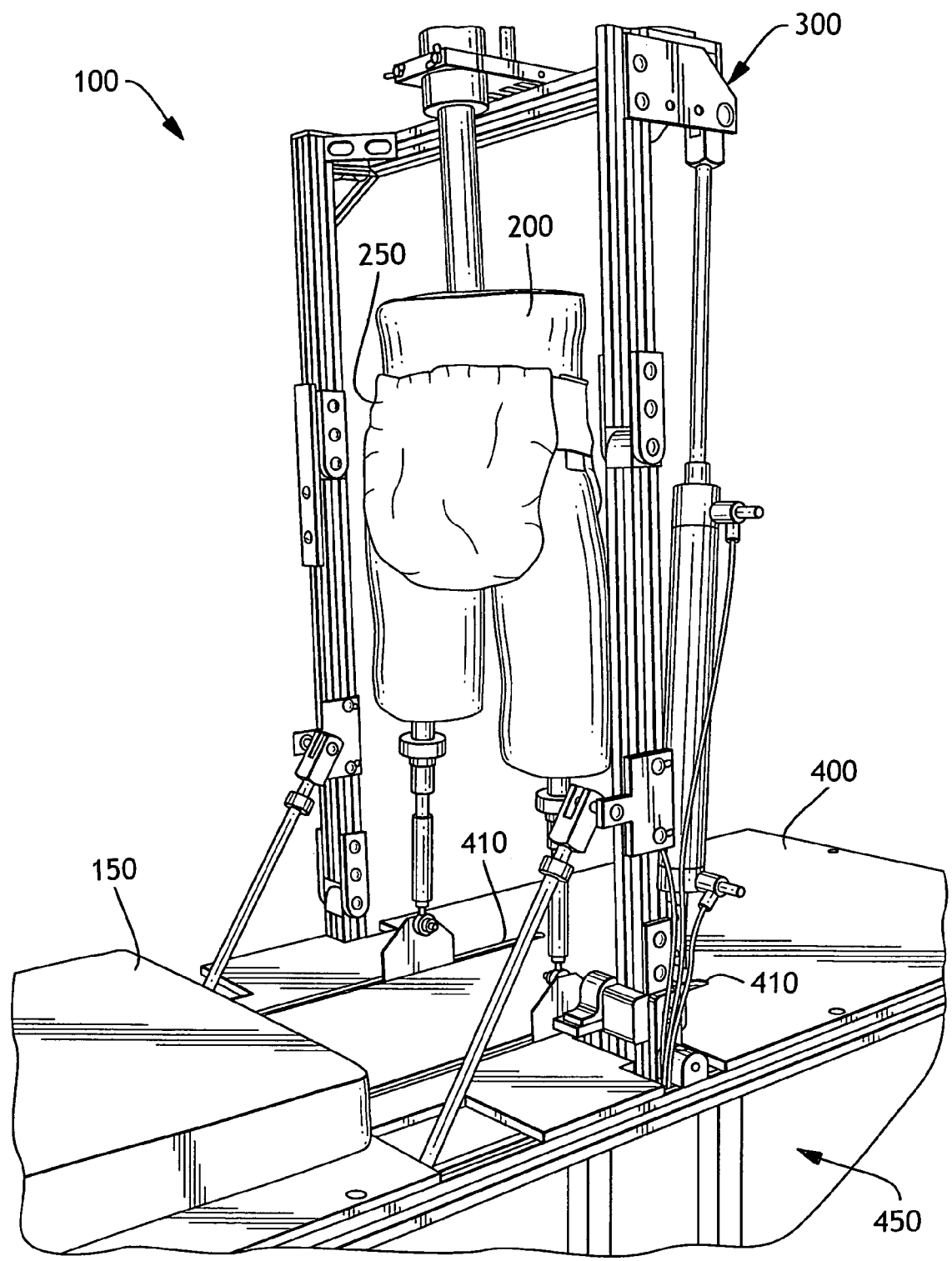
FIG. 6 representatively shows a perspective view of the mannequin system of FIG. 1 that is similar to FIG. 2, however, in this FIG. 6, the mannequin is not in the walking position.

FIG. 3 representatively shows the mannequin 200 in a crawling position. FIG. 4 shows the mannequin 200 in a prone, lying down position and supported by the assembled framework 300. FIG. 5 representatively shows the mannequin 200 in a sitting up position. FIG. 6 representatively shows the mannequin 200 in a standing still position.

From birth, human beings are dynamic creatures who frequently move and shift position. These movements affect articles that are applied to our bodies and worn. For absorbent articles, particularly disposable absorbent articles, adequate containment and control of bodily wastes requires an understanding of how body motions affect fit, integrity and position of such articles during use. The improved mannequin systems 100 of the invention permit the controlled simulation of the dynamics that absorbent articles experience in use. Additionally, pumping systems may be integrated with the mannequin systems 100 in order to simulate delivery of fluids into the articles being tested. Continuous monitoring of the environment of the absorbent articles being tested may be achieved by integrating sensors to measure temperature, relative humidity and pressure. Other sensor systems may be used to monitor the movement or flow of fluids within the product during wear and when leakage occurs. The mannequin systems 100 may be used to evaluate absorbent articles for changes in fit or material stress and/or failure during use. Post-use analysis of products may identify changes that could be made to the structure of the various components, such as fasteners, gaskets or the absorbent core of the absorbent article. Multiple mannequin systems 100 may be integrated to run off of a single personal computer (in sequence) to permit more efficient testing of larger sample sizes. Mannequins 200 of a range of anthropometric sizes may be interchanged on the assembled framework 300 in order to permit evaluation of absorbent articles of various sizes.

In another aspect of the present invention, the mannequin 200 may be constructed of a tear-resistant, reinforced elastomeric composite material. Many currently-available mannequins are designed to be constructed of various formulations of silicone. Silicone is capable of providing properties similar to human tissue and it is easy to cast into molds. However, silicone is not very resistant to tearing. In order to realistically mimic the movements of a human child, a mannequin 200 is capable of performing the same motions that a human child would. When a mannequin 200 is subjected to repetitive motion routines, the movement causes repeated stretching of the mannequin 200 material, particularly at the "joints" of the mannequin 200. The repeated stretching may result in tearing of the material used to form the mannequin 200. The mannequins 200 of the invention may be made from soft materials that also have high resistance to tear. The high resistance to tear is achieved by using reinforced or composite structures. The composite structure may be achieved in various ways including casting a soft material on to a reinforcing material, extruding a soft material onto a reinforcing material or sandwiching the soft material and the reinforcement between each other and bonding them together with any stretchable material. Mannequins 200 formed of reinforced elastomeric composite materials are more resistant to tearing and are generally more durable. The silicon base of the mannequins 200 may be reinforced with a knitted nylon material, such as the knitted nylon material used to form women's hosiery. The knitted nylon material is stretchable and therefore, does not restrict the stretch of the silicone, but it is also resistant to tearing.

Measurement of Soft Tissue Properties:

As already stated herein, one of the benefits of mannequins is that they increase the pace of research that can be completed on garments, including absorbent articles, such as disposable diapers for infants and toddlers. The more closely the mannequin mimics a human subject, the more similar the performance of the absorbent article on the mannequin is to how the article would perform on a human subject. Substantial investments in research are made by companies that produce disposable diapers for infants and toddlers. Hence, one beneficial use of a mannequin system is for the testing and evaluation of disposable diapers. In order to know how performance of a test diaper on the mannequin will compare to performance of the same test diaper on a human child, it is necessary to know the mechanical response of infant soft tissue. The mechanical response includes knowing how far the skin and underlying soft tissue will indent in response to a known force, such as the force of leg elastic surrounding the legs of a wearer of a disposable diaper. Soft tissue properties of infants, particularly over the area of the body covered by a disposable diaper are not well understood. In fact, computer simulations of disposable diapers in use on infants rely on adult soft tissue property ranges reported in the literature. Most of the adult soft tissue property ranges were obtained on areas of adult tissue outside of the body regions that would come in contact with a disposable diaper. Therefore, it is desirable to know the soft tissue properties of small children so that they can be compared to the "tissue" properties of a mannequin, particularly a mannequin formed of a reinforced elastomeric composite material.

An indentation device (indentor) has been developed and used to measure compression properties of soft tissue in the diaper area of children. Generally speaking, indentors function by positioning them perpendicular to the skin. As a specified force (or displacement) pushes the device against the skin, the corresponding deformation (or force) is recorded. Often, the resulting data, coupled with ultrasound information on tissue thickness, are used to determine the Young's Modulus of the tissue, which is then used as input for finite element models. This conversion of data is most frequently done through the use of the Hayes' equation, which provides a mathematical solution for the indentation of a thin, elastic, homogenous layer of material (a simplified representation of soft tissue) bonded to a rigid half-space (like bone).

The Hayes' equation has been used to evaluate the soft tissue properties of adult humans. The indentor for measuring soft tissue properties of children uses rate controlled indentation and a load cell that measures the reaction force resulting from tissue indentation. Conversely, it can also control the loading of soft tissue and measure the resulting indentation depths. The indentor includes two portions: a hand-held indentor apparatus, and a cabinet that houses hardware and support electronics. The dimensions of the hand held portion of the indentor may be as follows: an overall length of 25.40 cm, an overall outside diameter of 6.65 cm, and a total weight of 1.11 kg. Within the handheld portion of the instrument is a motor driven dovetail slide assembly that propels a moving bed assembly. An approximately 7.94 mm outer diameter flat-surfaced indentor probe connected to a 1 kg load cell and displacement potentiometer extends and retracts from the enclosed container. The hand-held portion of the instrument is cabled to a cabinet that houses support electronics and related hardware including a 12 VDC rechargeable battery source, from which the indentor is powered. Finally, the instrument is interfaced to a computer for operation and data collection.

As described above, ultrasound measurements are made to obtain tissue thickness data needed to calculate Young's Modulus. An example of acceptable ultrasound equipment for these measurements is the HDI 5000 manufactured by Phillips Medical Systems with a linear transducer operating within 7 MHz-12 MHz. Using the indentor and ultrasound measurements, mechanical properties can be calculated through the Hayes' equation. Soft tissue properties vary between individuals and also between body sites on the same individual. For example, the soft tissue of the buttocks and inner thigh is softer/less stiff than the soft tissue of the hip and the front of the thigh. Indentor measurements of children could be used for characterizing infants in computer simulations. The indentor measurements could also be used for comparison to indentor measurements made on reinforced elastomeric composite material used to form a mannequin. Such a comparison would indicate how representative the compressive properties of mannequins formed of reinforced elastomeric composite material are of real children.

The indentation device described above was used to measure the force vs. displacement compressive response of infants. Measurements were taken at numerous sites including the buttocks (Site 1), front of thigh (Site 2), inner thigh (Site 4), and hip (Site 6). Additionally, ultrasound measurements were made at each body location to determine the thickness of the soft tissue at that site. From this data, the effective Young's Modulus was calculated for each child at each site using the Hayes' equation. The specific equation to calculate Young's Modulus from indentation load-deformation data is as follows:

$$E = \frac{(1-v^2)}{2a\kappa(v, a/h)} * \frac{P}{w}$$

where: E=Young's Modulus
υ=Poisson's Ratio
a=radius of indentor probe
κ=constant
h=tissue thickness
P=load
w=indentation depth To solve this equation, the slope of the indentor curve at a given indentation depth, w, is entered into this equation as the P/w variable. Then, the radius of the indentor probe is measured and input into the equation as 3.97 mm. Next, the constant, κ, is obtained from the article, Hayes, W C, Keer, L M, Herrmann, G, and Mockros, L F. A Mathematical analysis for indentation tests of articular cartilage. *Journal of Biomechanics* 1972, 5: 541-551. In his article, Hayes defines a series of κ values that vary as a function of Poisson's ratio, the indentor radius, and tissue thickness. Poisson's ratio could not be measured in this study, and thus was assumed to be 0.49 since human soft tissue is often characterized as nearly incompressible. The tissue thickness, h, which was also needed to determine κ, was obtained from the ultrasound testing. Though ultrasound was not initially designed specifically to measure tissue thickness, it has been successfully used for this purpose. Clinically, the equipment software contains an algorithm to calculate the distance between any two points on the ultrasound image. In this study, a licensed sonographer chose the surface of the skin and the surface of the closest bone that was in line with the ultrasound probe to calculate the tissue thickness. As mentioned previously, the Hayes' equation assumes soft tissue to be elastic and homogeneous. Though soft tissue actually behaves as a viscoelastic, non-homogeneous material, this equation is still the current standard for characterizing and modeling soft tissue properties in humans and was used in this analysis for that reason. This is a simplification that is often made in modeling human soft tissue, especially when modeling the interaction between a human and a product when the product performance is of primary interest.

Figure 7:
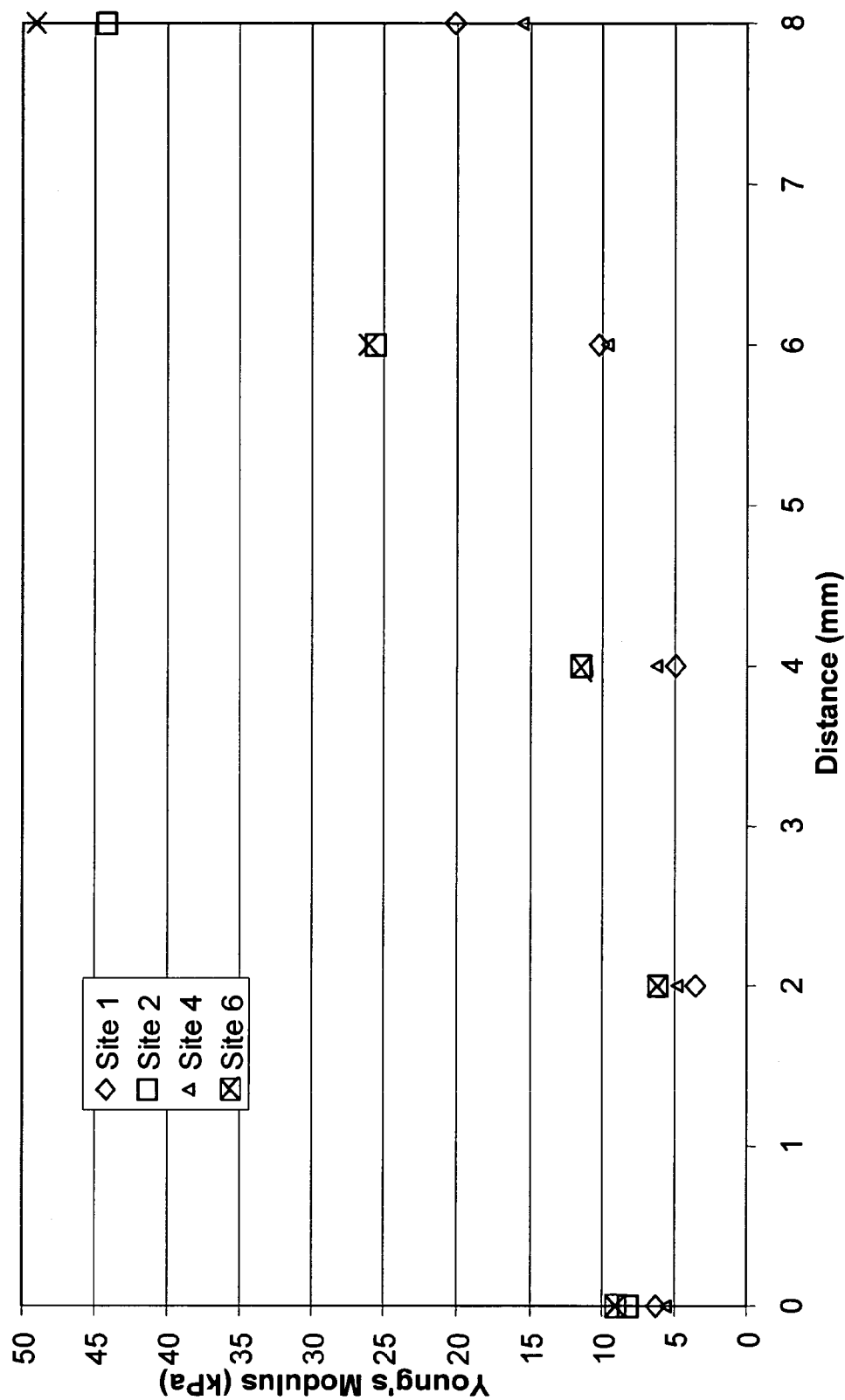
FIG. 7 representatively shows a graphical depiction of Young's Modulus (units of kiloPascals) versus indentation depth (units of millimeters) for four different body sites in the area of the human body that would be covered by an absorbent article, such as a disposable diaper; Body Site 1 is the buttocks, Body Site 2 is the front of the thigh, Body Site 4 is the inner thigh and Body Site 6 is the hip.

The median effective Young's Modulus values and 95% confidence intervals obtained through this study for each body site are shown in Table 1 below and in FIG. 7. The effective modulus values were calculated at indentation depths of 0, 2, 4, 6 and 8 millimeters (mm). These results are representative of 12 children, ages 19-24 months.

TABLE 1

| Site | Indentation Depth (mm) | Effective Young's Modulus (kPa) | | |
|---|---|---|---|---|
| | | 2.50% | 50th | 97.50% |
| Buttocks | 0 | 2.2055 | 6.2802 | 16.327 |
| Buttocks | 2 | 2.0231 | 3.5319 | 9.013 |
| Buttocks | 4 | 2.6657 | 4.9238 | 15.206 |
| Buttocks | 6 | 6.1073 | 10.246 | 34.709 |
| Buttocks | 8 | 8.5873 | 20.1472 | 69.466 |
| Front of Thigh | 0 | 0.4905 | 8.1609 | 21.265 |
| Front of Thigh | 2 | 3.7184 | 6.1139 | 10.133 |
| Front of Thigh | 4 | 5.9096 | 11.4751 | 22.437 |
| Front of Thigh | 6 | 14.5067 | 25.5642 | 42.976 |
| Front of Thigh | 8 | 19.8379 | 44.1733 | 75.716 |
| Inner Thigh | 0 | 1.6308 | 5.5818 | 13.862 |
| Inner Thigh | 2 | 2.7591 | 4.8062 | 7.517 |
| Inner Thigh | 4 | 3.1025 | 6.2454 | 13.471 |
| Inner Thigh | 6 | 5.4801 | 9.6779 | 28.937 |
| Inner Thigh | 8 | 6.6307 | 15.564 | 58.599 |
| Hip | 0 | 1.1811 | 9.079 | 34.94 |
| Hip | 2 | 3.539 | 6.1881 | 20.743 |
| Hip | 4 | 5.906 | 11.4343 | 59.587 |
| Hip | 6 | 9.4956 | 26.0355 | 95.18 |
| Hip | 8 | 14.3617 | 49.0429 | 148.902 |

As the numbers increase, this means that the body tissue is getting stiffer (e.g. contracting of muscles). When the body site is first indented, there is more fat and surface tissue; the further the body site indented, the muscle, which is stiffer, is approached. In FIG. 7, the graph shows the median Effective Young's Modulus at each site. Site 1 is the buttocks, Site 2 is the front of the thigh, Site 4 is the inner thigh and Site 6 is the hip. The buttocks and inner thigh are always less stiff than the front of the thigh and the hip. Also, for all locations, the deeper the indentation, the more stiff the tissue gets.

Figure 8:
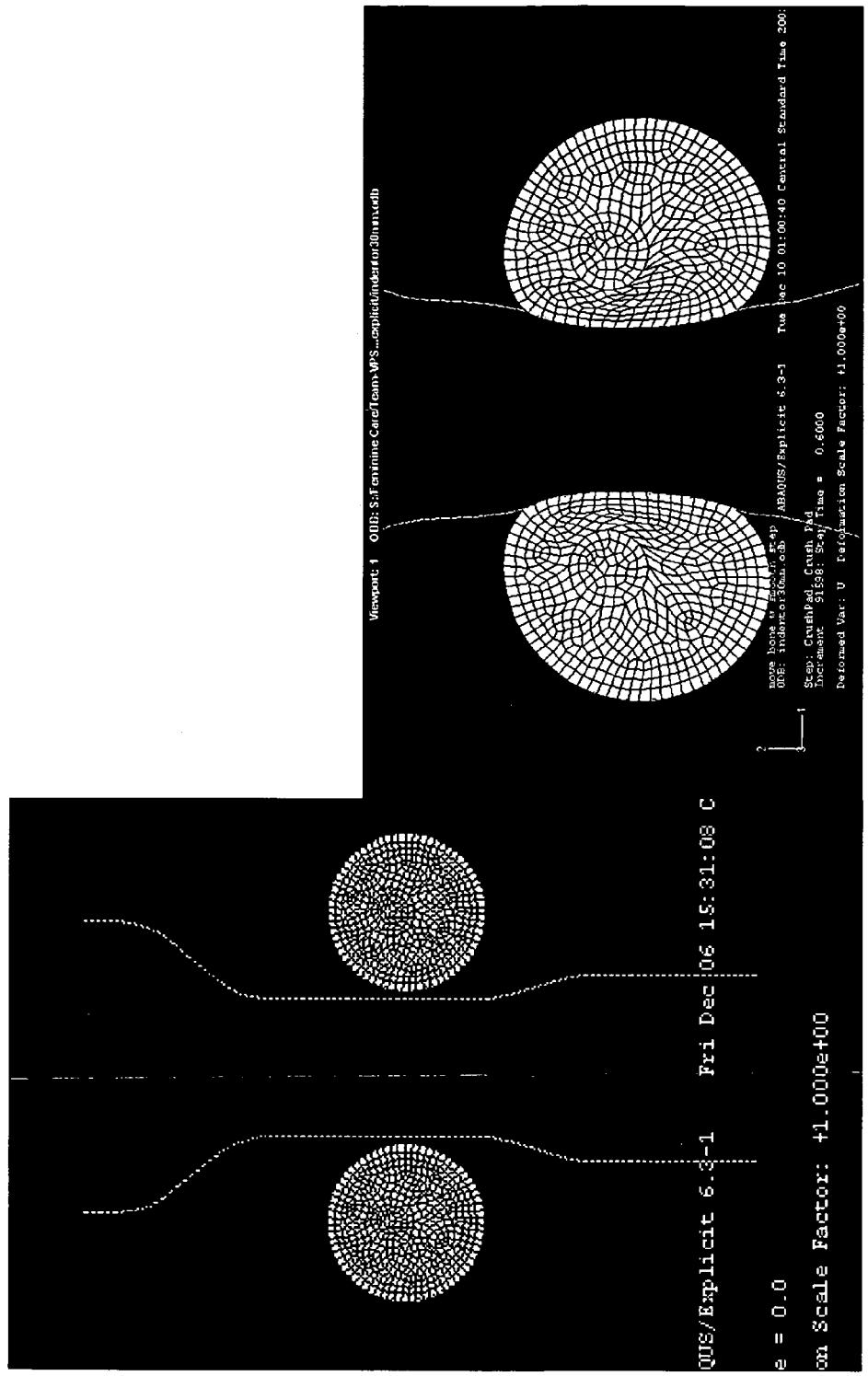
FIG. 8 representatively shows a computer simulation of infant soft tissue properties; the left side of the simulation shows the initial setup (the two circles represent the thighs and the rectangular area in the center represents an absorbent pad); the right side of the simulation shows a close-up of the thighs and the deformation of the absorbent pad once the simulation is complete.
Figure 9:
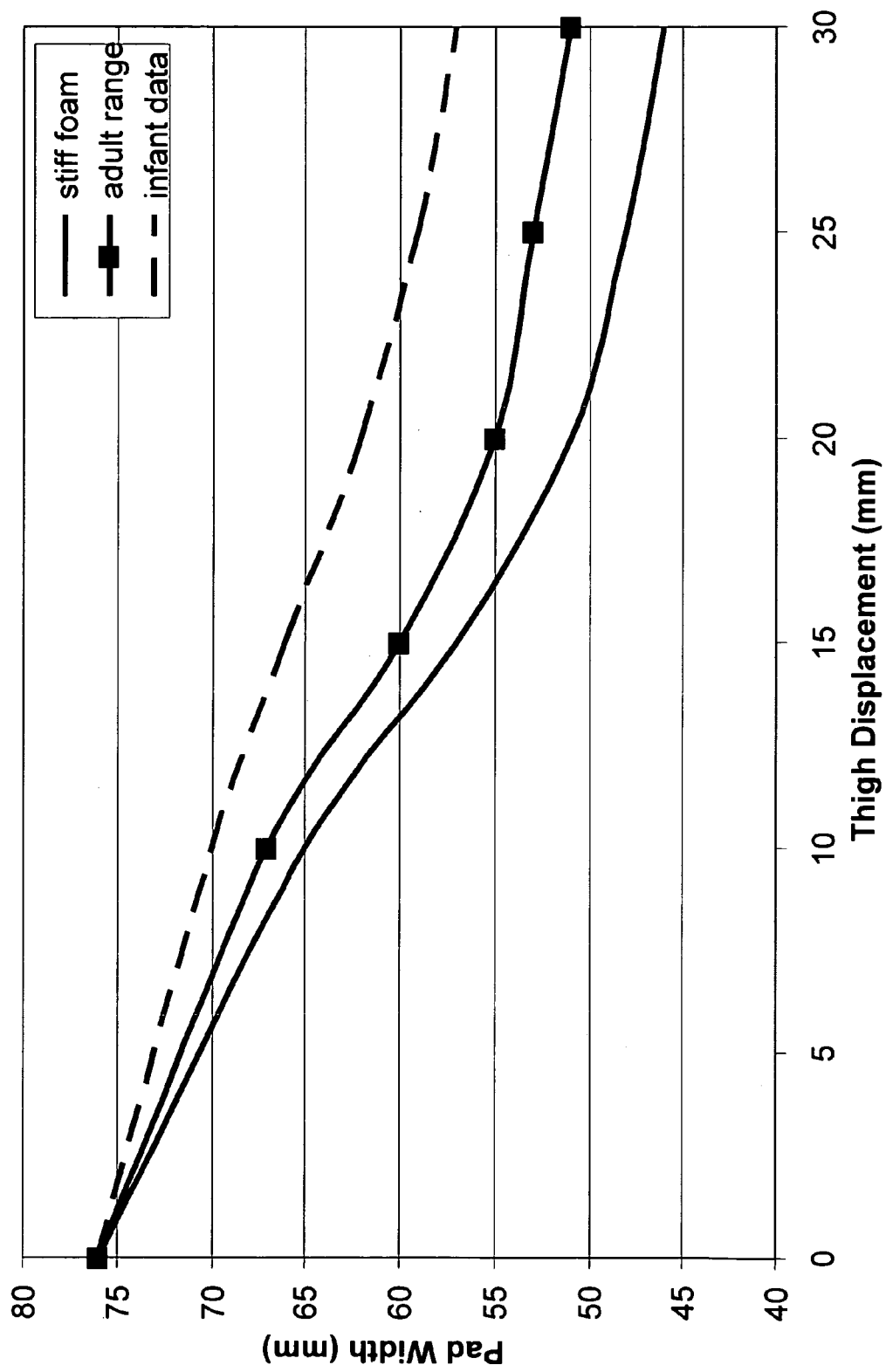
FIG. 9 representatively shows a graphical depiction of absorbent pad width (units of millimeters) versus thigh displacement (units of millimeters); the graph depicts the compressed absorbent pad width variations due to differences in soft tissue properties; the thigh displacement is simulated and in this case, the motion of bringing the legs together is simulated.
Figure 10:
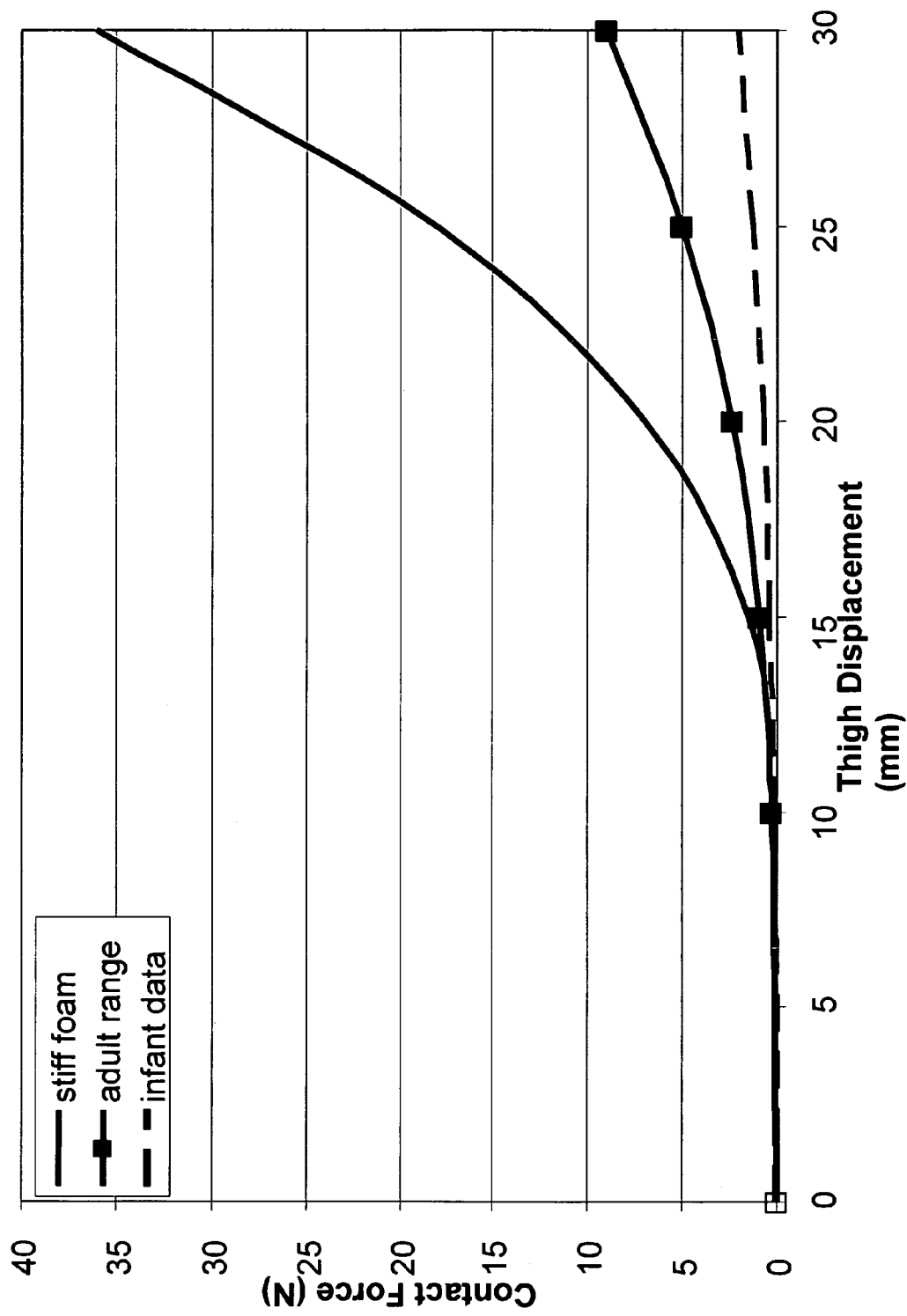
FIG. 10 representatively shows a graphical depiction of contact force (units of Newtons) versus thigh displacement (units of millimeters); the graph depicts the contact force variations between the absorbent pad and the thighs due to differences in soft tissue properties; the thigh displacement is simulated and in this case, the motion of bringing the legs together is simulated.
Figure 11:
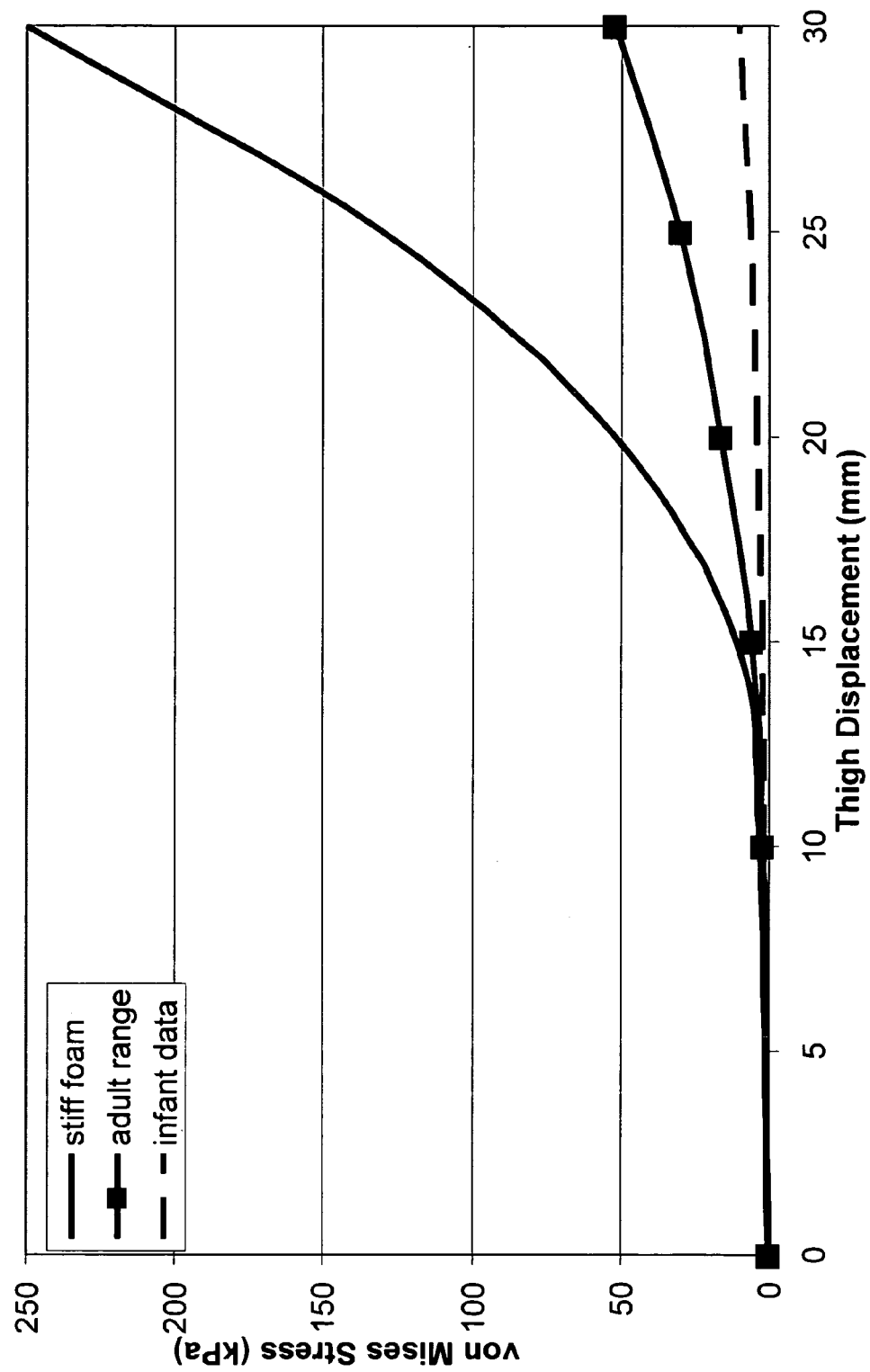
FIG. 11 representatively shows a graphical depiction of von Mises Stress (units of kiloPascals) versus thigh displacement (units of millimeters); the graph depicts maximum stress properties between the absorbent pad and the thighs due to differences in soft tissue properties; the thigh displacement is simulated and in this case, the motion of bringing the legs together is simulated.

The effective Young's modulus from one child was then input into a finite element simulation and compared to soft tissue properties that are representative of an adult as well as a stiff foam material, both of which have been used in previous diaper-infant simulations. The simulation consisted of two thighs that compressed an absorbent pad (FIG. 8). FIG. 8 (left) depicts the simulation initial setup with two thighs (white) and the absorbent pad (blue). The view is a transverse cross-section of the thighs, showing the machine/cross directions of the absorbent pad. FIG. 8 (right) is a close-up of the thigh and product deformation once the simulation is complete. This figure depicts the results of the infant soft tissue properties. The geometry of all components and the material properties of the absorbent did not change throughout the simulations. Only the soft tissue properties of the thighs were altered (Table 2). Results of the simulations indicated that the absorbent pad deforms less when contacted by infant thighs than it does when contacted by adult or foam thighs (FIG. 9). FIG. 9 is a graph that depicts the compressed pad width variations due to altering the soft tissue properties. The thigh displacement is the motion simulated; in this case, closing of the legs. It was also found that the contact force experienced between the thighs and product was significantly lower in the simulation with the infant soft tissue properties than in the other cases (FIG. 10). FIG. 10 is a graph that depicts the contact force variations between the absorbent and the thighs due to altering the soft tissue properties. The contact force is the force between the absorbent pad and the thigh. With thighs of softer tissue, the tissue is able to dissipate more force and thus, the contact force curve for the infant soft tissue data has a much lower slope than the stiff foam or the adult tissue. If "stiff foam" or "adult" tissue properties are selected to represent infant soft tissue and that data is used for a simulation predicting the "comfort" of an absorbent article, the results would suggest that the article is less comfortable for the infant than in reality it probably would be. If measuring contact pressure on a "regular" mannequin (that isn't constructed of a soft, reinforced elastomeric composite material), the same effect on the results would occur. Finally, the stress present within the deformed product was significantly lower in the model with the infant soft tissue properties than in the other models (FIG. 11). These results underscore the need to accurately specify infant soft tissue properties when simulating the interaction between infants and diapers or diaper components.

TABLE 2

| Simulation Version | Simulation Part | Material Model | Young's Modulus (MPa) | Poisson's Ratio | Density (tonne/mm3) |
|---|---|---|---|---|---|
| A-C | Absorbent | Hyperfoam | Stress - strain compression and tensile data | 0.0 | 5e-10 |
| A-C | Bones | Linear, Elastic | 5000 | 0.3 | 1.65e-9 |
| A | Soft Tissue (stiff foam-like) | Linear, elastic | 0.50 | 0.3 | 1.012e-9 |
| B | Soft Tissue (adult) | hyper-elastic | 0.080 | 0.49 | 1.012e-9 |
| C | Soft Tissue (infant) | hyper-elastic | 0.011 | 0.49 | 1.012e-9 |

Figure 12:
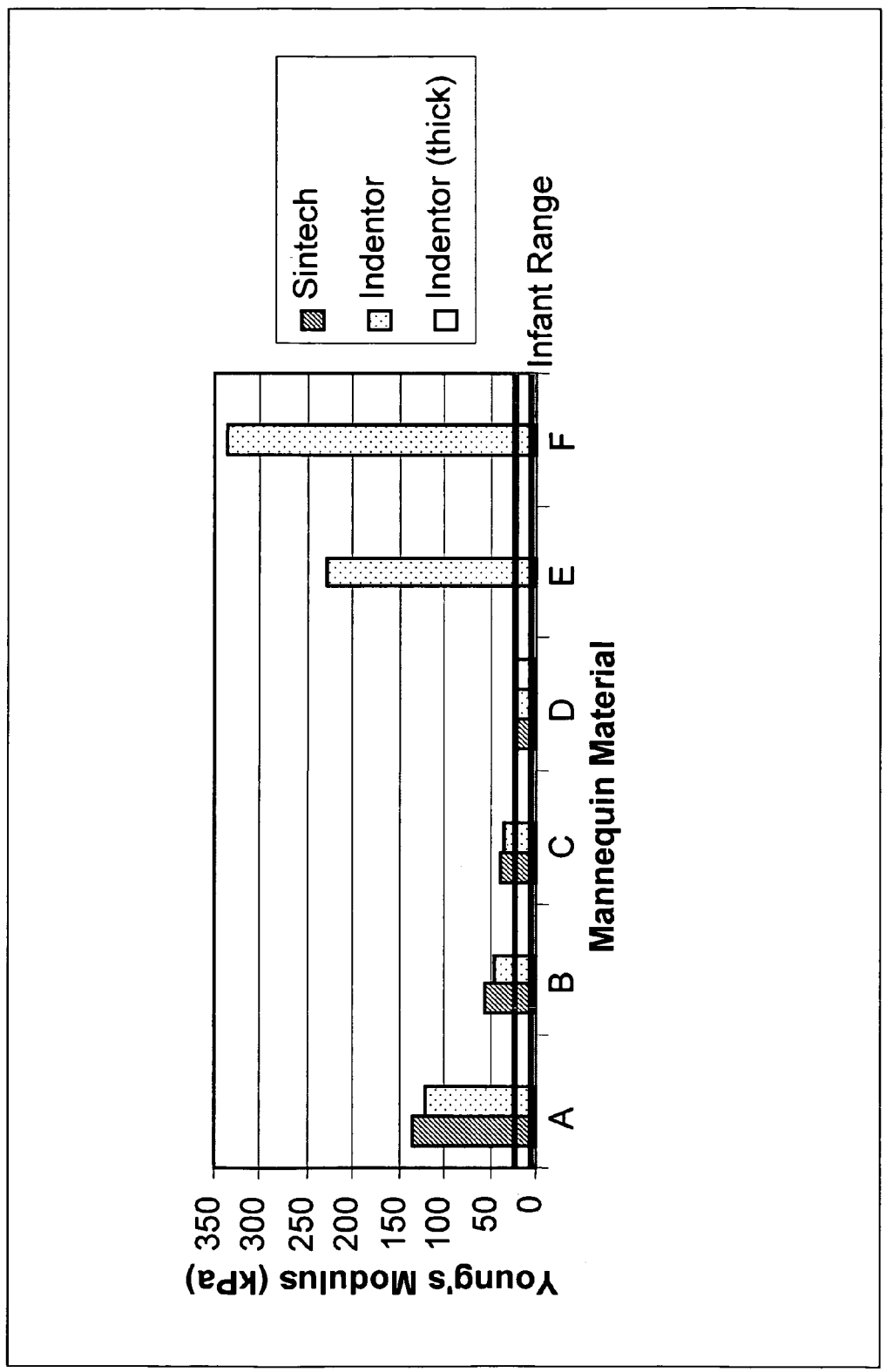
FIG. 12 representatively shows a graphical depiction of Young's Modulus (units of kiloPascals) for different types of materials that could be used to form a mannequin; the Young's Modulus values are based in part on indentation measurements; for each mannequin material, indentation measurements were made with three different indentor devices; the two horizontal lines represent the Young's Modulus value range based on indentation measurements made on one human child.

In a separate study, indentor and ultrasound measurements were taken for different materials that could be used to form mannequins desirably representing the soft tissue properties of an infant/toddler. The range of Young's Modulus values for possible mannequin materials was 22 KPa to 121 KPa. The Young's Modulus values for six different mannequin materials are shown in FIG. 12. The graph of FIG. 12 also shows the range of Young's Modulus values for infant soft tissue based on indentor/ultrasound measurements taken on human infants. Three of the mannequin materials were within the range of the human infant values. The correlation between the Young's Modulus for the mannequin samples and the human infant soft tissue showed three mannequin materials to be stiffer than the infant soft tissue (FIG. 12). Though not one of the samples represented in FIG. 12, the Young's Modulus value was determined for a reinforced elastomeric composite material that could be used to construct a mannequin 200 for the testing of garments, such as disposable diapers. The Young's Modulus for the reinforced elastomeric composite material was approximately 5-10 kPa; the reinforced elastomeric composite material included a silicone base that was reinforced with a knitted nylon material. This range of Young's Modulus is within the range for Young's Modulus values for infant soft tissue.

Examples of Use of Mannequin System to Measure Garment Performance

In order to illustratively demonstrate how the mannequin systems 100 of the present invention may be used to measure product performance, the following evaluation was conducted. Three commercially-available types of disposable diapers were put through the same routines of mannequin motion and then the change from original position on the mannequin was measured for each disposable diaper. The mannequin 200 was covered with a nylon/spandex tight in order to give it a surface that was slicker and more typical of human skin. For each disposable diaper that was tested, the mannequin 200 started in the standing position. The disposable diapers were loaded with 140 milliliters (ml) of saline solution prior to beginning the motion routine. The mannequin motion routine consisted of five (5) seconds of walking, bending over to the crawling position, five (5) seconds of crawling and returning to the standing position. This motion routine was repeated fifteen (15) times before the mannequin 200 returned to the standing position. At the end, the displacement of the disposable diapers at the front waist of the diaper ("Front Droop"), the back waist of the diaper ("Back Droop"), the side of the diaper at the hip ("Side Droop"), the ear portion including the mechanical faster (compression in the lengthwise direction of the diaper) ("Ear MD") and the sag in the crotch of the diaper ("Crotch Sag") were measured. The measurements for a HUGGIES Supreme diaper (available from the Kimberly-Clark Corporation, Neenah, Wis.) including a "nested" ear portion (Step Size 4) are shown in Table 3 below.

TABLE 3

| Trial | Front Droop (mm) | Back Droop (mm) | Side Droop (mm) | Ear MD (mm) | Crotch Sag (mm) |
|---|---|---|---|---|---|
| 1 | 44 | 11 | 29 | 1 | 25 |
| 2 | 37 | 19 | 26 | 1 | 21 |
| 3 | 45 | 20 | 27 | 1 | 21 |
| 4 | 41 | 26 | 27 | 2 | 26 |
| 5 | 45 | 36 | 28 | 1 | 28 |
| 6 | 46 | 29 | 36 | 1 | 23 |

TABLE 3-continued

| Trial | Front Droop (mm) | Back Droop (mm) | Side Droop (mm) | Ear MD (mm) | Crotch Sag (mm) |
|---|---|---|---|---|---|
| 7 | 38 | 21 | 26 | 0 | 21 |
| 8 | 39 | 22 | 25 | 0 | 14 |
| 9 | 33 | 20 | 21 | 1 | 20 |
| 10 | 33 | 22 | 23 | 1 | 20 |
| Average | 40 | 23 | 27 | 1 | 22 |
| Standard Deviation | 5 | 7 | 4 | 1 | 4 |

The measurements for a HUGGIES Supreme diaper (available from the Kimberly-Clark Corporation of Neenah, Wis.) including a wider (i.e. larger) ear portion (Step Size 4) are shown in Table 4 below.

TABLE 4

| Trial | Front Droop (mm) | Back Droop (mm) | Side Droop (mm) | Ear MD (mm) | Crotch Sag (mm) |
|---|---|---|---|---|---|
| 1 | 29 | 19 | 24 | Not Applicable | 25 |
| 2 | 30 | 12 | 20 | Not Applicable | 19 |
| 3 | 26 | 10 | 16 | Not Applicable | 11 |
| 4 | 24 | 24 | 19 | Not Applicable | 12 |
| 5 | 27 | 19 | 21 | Not Applicable | 18 |
| 6 | 31 | 20 | 20 | Not Applicable | 16 |
| 7 | 32 | 20 | 20 | Not Applicable | 11 |
| 8 | 29 | 14 | 20 | Not Applicable | 15 |
| 9 | 29 | 13 | 17 | Not Applicable | 13 |
| 10 | 26 | 19 | 19 | Not Applicable | 14 |
| Average | 28 | 17 | 20 | | 15 |
| Standard Deviation | 2 | 4 | 2 | | 4 |

The measurements for a PAMPERS diaper (available from the Procter & Gamble Company of Cincinnati, Ohio) (Step Size 4) are shown in Table 5 below.

TABLE 5

| Trial | Front Droop (mm) | Back Droop (mm) | Side Droop (mm) | Ear MD (mm) | Crotch Sag (mm) |
|---|---|---|---|---|---|
| 1 | 31 | 15 | 25 | Not Applicable | 21 |
| 2 | 29 | 9 | 21 | Not Applicable | 25 |
| 3 | 24 | 8 | 17 | Not Applicable | 17 |
| 4 | 24 | 16 | 21 | Not Applicable | 12 |
| 5 | 40 | 20 | 26 | Not Applicable | 26 |
| 6 | 38 | 18 | 30 | Not Applicable | 16 |
| 7 | 33 | 16 | 26 | Not Applicable | 19 |
| 8 | 46 | 17 | 29 | Not Applicable | 26 |
| 9 | 42 | 18 | 32 | Not Applicable | 11 |
| 10 | 35 | 18 | 31 | Not Applicable | 27 |

TABLE 5-continued

| Trial | Front Droop (mm) | Back Droop (mm) | Side Droop (mm) | Ear MD (mm) | Crotch Sag (mm) |
|---|---|---|---|---|---|
| Average | 34 | 16 | 26 | | 20 |
| Standard Deviation | 7 | 4 | 5 | | 6 |

Figure 13:
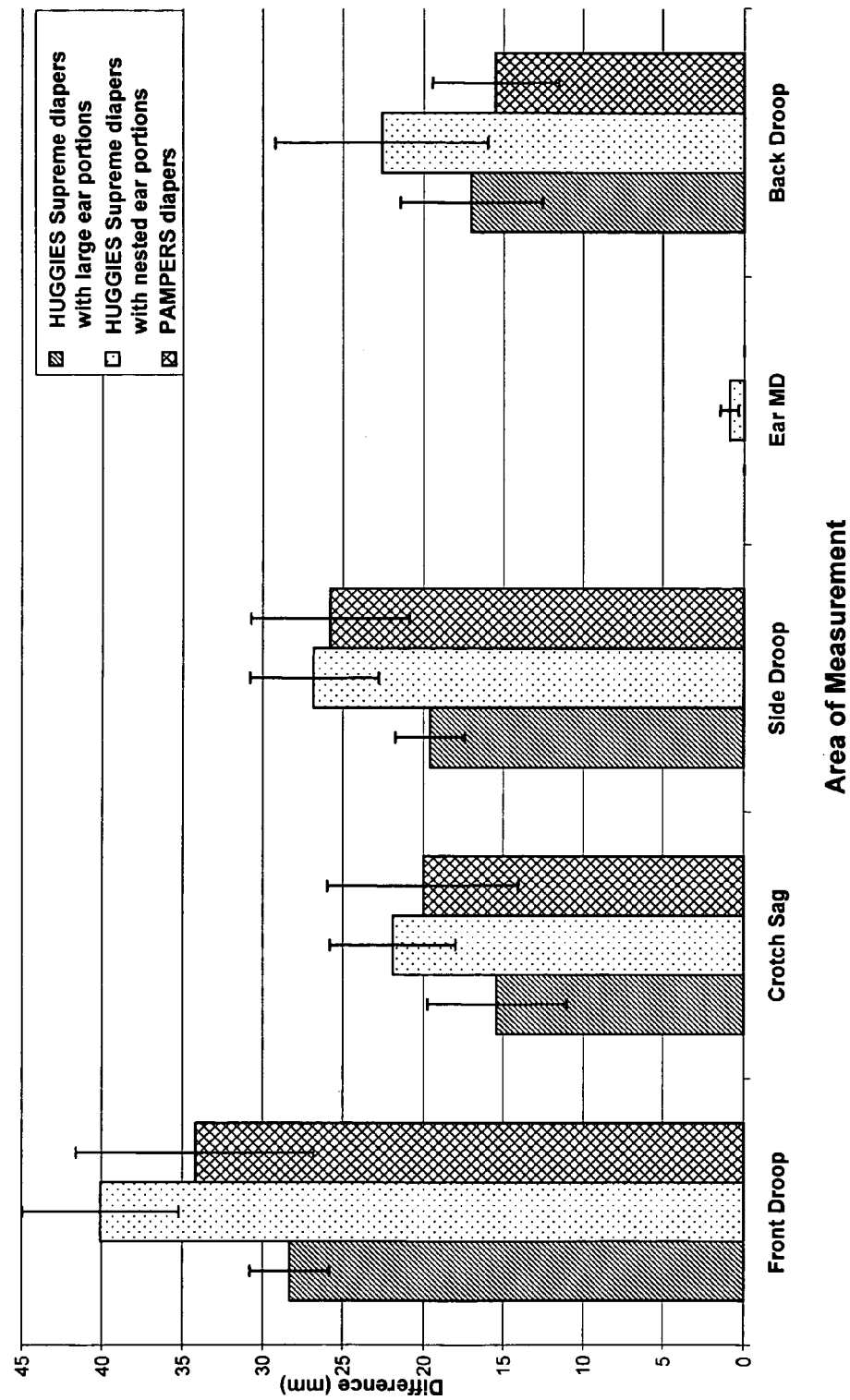
FIG. 13 representatively shows a graphical depiction of the displacement ("difference" in units of millimeters) of three different disposable absorbent articles measured at different locations of the articles after the articles were subjected to a series of repetitive motions using a mannequin system of the invention, such as the mannequin system shown in FIG. 1.

FIG. 13 compares the relative displacement of the three disposable diaper products at the various locations where displacement was measured. The results show that for this particular mannequin motion routine, the disposable diaper product that had the lowest displacement during wear was the HUGGIES Supreme diaper with the wider ear portion.

While the mannequin systems of the invention have been described in detail with respect to specific aspects thereof, it will be appreciated that those skilled in the art, upon attaining an understanding of the foregoing, may readily conceive of alterations to, variations of and equivalents to these systems. Accordingly, the scope of the present invention should be assessed as that of the appended claims and any equivalents thereto.

We claim:

1. A mannequin system for testing absorbent articles including:
    an assembled framework;
    at least two mannequins secured to the assembled framework by upward shafts, wherein the mannequins are formed of a reinforced elastomeric composite material and the mannequins have absorbent articles donned on them;
    a set of pneumatic cylinders, wherein the pneumatic cylinders move the upward shafts in a vertical direction;
    a programmable logic controller connected to a personal computer through a computer interface board; the programmable logic controller is also connected to the pneumatic cylinders by air solenoid valves;
    a motor drive assembly connected to the assembled framework by a linear crank arm; and a fluid pumping system to deliver a fluid solution to the absorbent articles.

2. The mannequin system of claim 1, wherein the reinforced elastomeric composite material includes silicone and knitted nylon.

3. The mannequin system of claim 1, wherein the set of pneumatic cylinders includes a side pneumatic cylinder and a side-supporting pneumatic cylinder.

4. The mannequin system of claim 1, wherein the motor drive assembly includes a motor and a motor drive controller.

5. The mannequin system of claim 1, wherein the set of air solenoid valves are housed within a manifold.

6. The mannequin system of claim 1, further comprising software executable on the personal computer for controlling the mannequin.

* * * * *